US012282405B2

(12) United States Patent
Keskin et al.

(10) Patent No.: US 12,282,405 B2
(45) Date of Patent: Apr. 22, 2025

(54) DYNAMIC TIME WINDOWING FOR DEPENDENCIES OF HARDWARE-FAILURE AND LOG-FILE EVENTS IN INTERNET OF THINGS (IoT) AND OTHER DEVICES

(71) Applicant: QUALCOMM Incorporated, San Diego, CA (US)

(72) Inventors: Mustafa Keskin, San Diego, CA (US); Murat Cakir, San Diego, CA (US); Lindsey Makana Kostas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 18/340,004

(22) Filed: Jun. 22, 2023

(65) Prior Publication Data

US 2024/0427683 A1    Dec. 26, 2024

(51) Int. Cl.
*G06F 11/30*    (2006.01)
*G06F 11/07*    (2006.01)

(52) U.S. Cl.
CPC ...... *G06F 11/3075* (2013.01); *G06F 11/0757* (2013.01)

(58) Field of Classification Search
CPC .................. G06F 11/3075; G06F 11/0757
See application file for complete search history.

(56) References Cited

U.S. PATENT DOCUMENTS

| 10,854,092 | B1* | 12/2020 | Subramaniyan ....... G08G 5/003 |
| 2017/0364561 | A1 | 12/2017 | Wu et al. |
| 2018/0324199 | A1 | 11/2018 | Crotinger et al. |
| 2020/0057661 | A1* | 2/2020 | Bendfeldt .............. G06V 40/70 |

FOREIGN PATENT DOCUMENTS

EP    4080823 A1    10/2022

OTHER PUBLICATIONS

International Search Report and Written Opinion—PCT/US2024/026013—ISA/EPO—Jul. 12, 2024.

* cited by examiner

*Primary Examiner* — Jigar P Patel
(74) *Attorney, Agent, or Firm* — QUALCOMM Incorporated

(57) ABSTRACT

This disclosure provides methods, devices, and systems for troubleshooting operation of an electronic device, the method comprising by receiving performance data from a plurality of electrical components, and including a portion of the performance data within a dynamic time window. The portion includes event data. The dynamic time window may be manipulated to include dependent event data within the portion. The dependent event data shares an interdependency with the event data. Troubleshooting analysis determined from the interdependency may be output.

30 Claims, 8 Drawing Sheets

DYNAMIC TIME WINDOWING FOR DEPENDENCIES OF HARDWARE-FAILURE AND LOG-FILE EVENTS IN INTERNET OF THINGS (IoT) AND OTHER DEVICES

BACKGROUND

1. Field of Disclosure

The present disclosure relates generally to troubleshooting and debugging electronic devices, and more specifically to a machine learning and natural language processing-based system for Internet of Things (IoT) device troubleshooting.

2. Description of Related Art

Customer service provided by IoT device companies may include responsibilities such as troubleshooting and debugging their product components. Such IoT related components have become more complex over time. In turn, the number of technical issues encountered with these IoT devices has increased in step with their complexities. Challenges are particularly apparent in the meshed interdependencies present between the system-on-a-chips (SoCs), passive components, and other modules of the IoT devices. As a result, the demand for company resources assigned to troubleshooting the IoT devices has increased.

SUMMARY

The systems, methods, and devices of this disclosure each have several innovative aspects, no single one of which is solely responsible for the desirable attributes disclosed herein.

One innovative aspect of the subject matter described in this disclosure may be implemented as a method of troubleshooting operation of an electronic device, the method comprising by receiving performance data from a plurality of electrical components, and including a portion of the performance data within a dynamic time window. The portion includes event data. The dynamic time window may be manipulated to include dependent event data within the portion. The dependent event data shares an interdependency with the event data. Troubleshooting analysis determined from the interdependency may be output.

In some aspects, the method may further include executing classifier processes on the portion of the performance data included within the dynamic time window. The event data is associated with a failure. Aspects of the disclosure may include determining the interdependency between the event data and the dependent event data. Other aspects may include adjusting a timestamp of at least one of the event data and the dependent data. The performance data includes at least one of: a log file, an error message, a built-in self-test (BIST) report, a word report, text, or an American Standard Code for Information Interchange (ASCII) file.

In other aspects, the method may include performing at least one of natural language processing or machine learning. The dynamic time window may be manipulated in response to determining the interdependency. Other aspects may include organizing the event data and the dependent event data within the dynamic time window according to a relative timing of each with respect to one another. The plurality of electrical components comprises part of an Internet of Things (IoT) device or a system on a chip (SoC).

In other aspects, the method may include determining that the event data shares the interdependency with the event data by performing the determining at a classifier or a main processor of an Internet of Things (IoT) device. Other aspects may include performing a criticality assessment on the performance data to determine the portion of the performance data. Other or the same aspect of the method may include weighting critical data based on the criticality assessment. Still other aspects include storing the analysis in a historical database to train for future event dependencies. Other aspect may include applying a word-to-vector algorithm to the portion of the performance data. Another implementation may include categorizing the portion of the performance data into a plurality of bags-of-words.

Another innovative aspect of the subject matter described in this disclosure may be implemented in an apparatus for troubleshooting operation of an electronic device, the apparatus comprising one or more processors, a memory coupled with the one or more processors, and instructions stored in the memory and executable by the one or more processors to cause the one or more processors to receive performance data from a plurality of electrical components, include a portion of the performance data within a dynamic time window, where the portion includes event data, manipulate the dynamic time window to include dependent event data within the portion, wherein the dependent event data shares an interdependency with the event data, and output troubleshooting analysis determined from the interdependency.

In some aspects, the one or more processors are further configured to execute classifier processes on the portion of the performance data included within the dynamic time window. The classifier processes may include at least one of natural language processing or machine learning. The event data is associated with a failure. The one or more processors are further configured to determine the interdependency between the event data and the dependent event data. In another aspect, the dynamic time window is manipulated in response to determining the interdependency.

According to another particular aspect, the one or more processors are further configured to adjust a timestamp of at least one of the event data and the dependent data. In another implementation, the one or more processors are further configured to organize the event data and the dependent event data within the dynamic time window according to a relative timing of each with respect to one another. The performance data includes at least one of: a log file, an error message, a BIST report, a word report, text, or an ASCII file. The one or more processors are further configured to determine that the event data shares the interdependency with the event data by performing the determining at a classifier or a main processor of an IoT device. The one or more processors are further configured to store the analysis in a historical database to train for future event dependencies.

According to a particular aspect, an apparatus may include a means for a means for receiving performance data from a plurality of electrical components, a means for including a portion of the performance data within a dynamic time window, where the portion includes event data, and a means for manipulating the dynamic time window to include dependent event data within the portion, where the dependent event data shares an interdependency with the event data, and a means for outputting troubleshooting analysis determined from the interdependency.

Another innovative aspect of the subject matter described in this disclosure may be implemented in a non-transitive computer-readable medium storing computer executable code to receive performance data from a plurality of electrical components, include a portion of the performance data within a dynamic time window, where the portion includes event data, manipulate the dynamic time window to include dependent event data within the portion, where the dependent event data shares an interdependency with the event data, and output troubleshooting analysis determined from the interdependency.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

DETAILED DESCRIPTION

Figure 1:
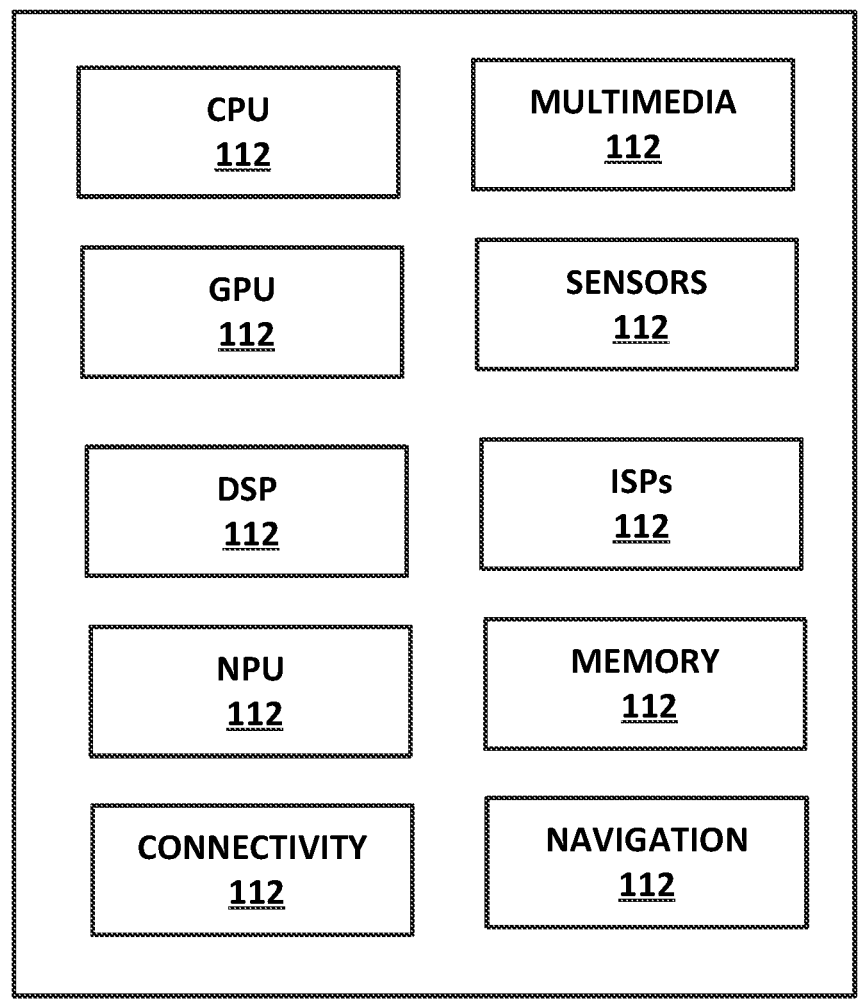
FIG. 1 illustrates an example implementation of designing a neural network using an Internet of Things (IoT) device, including a general-purpose processor, in accordance with certain aspects of the present disclosure.

The following description is directed to certain implementations for the purposes of describing innovative aspects of this disclosure. However, a person having ordinary skill in the art will readily recognize that the teachings herein may be applied in a multitude of different ways.

Several aspects of troubleshooting IoT devices are presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

As IoT devices have become more capable and increased in application, so have they become more complex with an increasing number of potential problems. Resources (e.g., processing, memory, and debuggers) for addressing system failures can be strained due to the high-volume trouble log files and limited time for resolving the increased complexity of issues.

In a typical IoT device, there are multiple IC parts, modules, and passive devices. These parts have complex mesh-type dependencies upon each other. IC hardware and register programming levels may not be investigated in connection with IoT device, higher level issues. In another example, certain IC may have formatting issues that hinder communications with other ICs. In some specific examples, a power management chipset may provide power and regulated voltages to other chipsets. A temperature compensated crystal oscillator (TCXO) or oscillator may provide a clock signal to digital or mixed-signal circuits. Not all the IC and module parts are connected to one another, and their respective interactions may be limited to merely an input, an output, and/or both. In addition, the respective response times may vary significantly. Data capturing these scenarios may conventionally only be available in different characterization cycles and may be analyzed by different debugging teams.

Thus, the challenges presented by meshed interdependencies between SoCs, modules, and passive components of the IoT devices can result in a misidentification of underlying component interactions and underperformance. In one specific example of an interdependency, an interaction between clock block module and a power management module may not be immediately detected, but may nonetheless cause a slow drift towards a failure in a die down the production line.

Due to this complex structure, failure analysis and log file debugging becomes extremely time consuming, as well as computationally overburden. For these reasons, implementations of the subject matter described herein may use a data driven approach that locates interdependencies and learns patterns from big data to address and debug the issues related to IoT devices.

An implementation may prescreen performance data according to machine learning processes to limit a volume of data to be debugged to a more manageable amount. The data may be included in the dynamic time window. The dynamic time window may be manipulated to include event data that shares an interdependency with event data already within the dynamic time window. The interdependent events may be associated with a failure to be debugged.

Put another way, processes may receive performance data relating to the operation of one or more components of an IoT or other device. The performance data may be retrieved or delivered in the form of log files, error messages, built-in self-test (BIST) reports, as well as word reports that include text or American Standard Code for Information Interchange (ASCII) files that include event data. Event data may be associated with a timestamp and a hardware ID, as well as an indication of a hardware or software failure or other performance parameter. The dynamic time window may be configured to include only a portion of the performance data. The portion of the performance data may comprise a relatively small percentage of the performance data for the purpose of focusing analysis and limiting the amount of data that must be transferred or analyzed. The dynamic time window may thus minimize the data used for processing and analysis of IoT devices and networks during failure or bug analysis, in addition to speeding analysis for faster resolution of issues.

The dynamic time window may include a portion of the performance data comprising first event data associated with a software or hardware failure. A classifier module may employ at least one of neural networking or machine learning processes on the portion of the performance data included within the dynamic time window. The classifier module or a processor of the IoT or other device may determine that the first event shares a dependency with second event data of the performance data. In response to the determined dependency, the system may manipulate the dynamic time window to include the second event. In some instances, the system may execute fault analysis techniques on contents of the dynamic time window. The system may output analysis regarding the failure determined from the first and second event data. The dynamic time window may allow the system to predict problems, classify them, and then go back and adjust a timestamp of a critical event(s) to avoid a catastrophic failure the next time around.

In practice, the IoT devices may be tested with emulation platforms and test chips. Emulation platforms, for example, may be implemented with field programmable gate arrays (FPGAs) programmed to operate as virtual chips to enable testing of IoT and associated microchip designs. After a design has been approved, test chips (e.g., application specific integrated chips (ASICs)) may be fabricated. Test chips enable testing of the silicon to locate and fix issues before committing to large scale production of the chip.

Aspects of the present disclosure additionally incorporate a machine learning and natural language processing to adjust the dynamic time window and troubleshoot potential component failures. Deploying the troubleshooting system may decrease the turnaround time for chip troubleshooting and ultimately chip manufacturing. The troubleshooting system may also increase the chip quality, increase customer satisfaction, and reduce return material authorization (RMA) processing of chips.

As described herein, an implementation may use machine learning with artificial neural networks that interconnected groups of artificial neurons (e.g., neuron models). The artificial neural network may be a computational device or be represented as a method to be performed by a computational device. Convolutional neural networks, such as deep convolutional neural networks, are a type of feed-forward artificial neural network.

According to aspects of the present disclosure, the machine learning and natural language processing-based troubleshooting system continuously may update the dynamic time window to identify component interdependencies, while additionally focusing performance data to focus analysis and other hardware and software resources. The troubleshooting system employs an IoT device domain-aware automated design troubleshooting methodology.

Particular implementations of the subject matter described in this disclosure can be implemented to realize one or more of the following potential advantages. By continuously updating the dynamic time window, implementation may identify previously undetectable component interdependencies. The dynamic time window may additionally screen performance data to focus analysis and other hardware and software resources. Implementations of the subject matter described in this disclosure may have particular application in fault detection and network security endeavors, among others.

Aspects of an implementation of a system may automatically facilitate securely monitoring, troubleshooting, and managing mobile devices. Other benefits may include storing crucial information on mobile devices, choosing eligible applications to be present on the devices, locating devices, and securing devices. Aspects may reduce data storage by virtue of the focused time windowing. Classification may be improved using a hardware domain centric model. Processes may allow quicker resolution of interrupts and other failures. Implementations may additionally decrease power dissipation by minimizing and dynamically adjusting the time window when useful. Other aspects may reduce the time to training, as well as inference phases. All implementations may reduce the time-to-fault detection and classification. Other benefits may include reduced data storage requirements and power dissipation. Models may be uploaded directly based on an integrated circuit of the IoT. Aspects of the disclosure may reduce a number of log files to be analyzed, as well as reduce the parameters from the log files.

FIG. 1 illustrates an example implementation of an Internet of Things (IoT) device 100, which may include a central processing unit (CPU) 102 or a multi-core CPU, in accordance with certain aspects of the present disclosure. The IoT device 100 may have issues that need troubleshooting by the SoC vendor.

Variables (e.g., neural signals and synaptic weights), system parameters associated with a computational device (e.g., neural network with weights), delays, frequency bin information, and task information may be stored in a memory block associated with a classifier module 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

More specifically regarding the neural network and weighted performance data, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as back propagation, as it involves a backward pass through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the system may be presented with performance data (e.g., log files), and a forward pass through the network may yield an output that may be considered an inference or a prediction.

The IoT device 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the classifier module 108 is implemented in the CPU, DSP, and/or GPU. The IoT device 100 may also include a sensor processor 114, image signal processors (ISPs) 116, and/or navigation module 120, which may include a global positioning system.

The IoT device 100 may be based on an ARM instruction set. In an aspect of the present disclosure, the instructions loaded into the general-purpose processor 102 may comprise code to receive a troubleshooting query for an IoT device. The troubleshooting query is generated by a user. The instructions loaded into the general-purpose processor 102 may also comprise code to perform natural language processing and machine learning to cluster the troubleshooting query into one of a number of semantically similar troubleshooting categories. The instructions loaded into the general-purpose processor 102 may further comprise code to adjust the dynamic time window to locate possible interdependencies between components. The instructions loaded into the general-purpose processor 102 may also comprise code to generate a recommendation in response to the troubleshooting query.

The classifier module 108 of one implementation may include a neural processing unit (NPU). Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top down) connections. In a recurrent connection, the output from a neuron in a given layer may be communicated to another neuron in the same layer.

A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. In a fully connected neural network, a neuron in a first layer may communicate its output to every neuron in a second layer, so that each neuron in the second layer will receive input from every neuron in the first layer. In a locally connected neural network, a neuron in a first layer may be connected to a limited number of neurons in the second layer. More generally, a locally connected layer of the locally connected neural network may be configured so that each neuron in a layer will have the same or a similar connectivity pattern, but with connections strengths that may have different values. The locally connected connectivity pattern may give rise to spatially distinct receptive fields in a higher layer because the higher layer neurons in a given region may receive inputs that are tuned through training to the properties of a restricted portion of the total input to the network.

The convolutional neural network may be configured such that the connection strengths associated with the inputs for each neuron in the second layer are shared. Convolutional neural networks may be well suited to problems in which the spatial location of inputs is meaningful. Convolutional neural networks may include layers of neurons that may be configured in a tiled receptive field. Support vector machines are machine learning classifiers. A support vector machine locates a decision boundary (e.g., hyperplane) in space to classify data points in the space. An implementation applies machine learning to troubleshoot semiconductor devices to achieve greater efficiencies.

The classifier module 108 may additionally or alternatively include deep learning architectures. Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs.

Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to combinations of features, such as simple shapes for visual data or combinations of sounds for auditory data. For instance, higher layers may learn to represent complex shapes in visual data or words in auditory data. Still, higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

The classifier module 108 may additionally or alternatively include deep belief networks (DBNs). DBNs are probabilistic models comprising multiple layers of hidden nodes. DBNs maybe used to extract a hierarchical representation of training data sets. A DBN may be obtained by stacking up layers of Restricted Boltzmann Machines (RBMs). An RBM is a type of artificial neural network that can do a probability distribution over a set of inputs. Because RBM scan learn a probability distribution in the absence of information about the class to which each input should be categorized, RBM scan often used in unsupervised learning. Using a hybrid unsupervised and supervised paradigm, the bottom RBMs of a DBN may be trained in an unsupervised manner and may serve as feature extractors, and the top RBM maybe trained in a supervised manner (on a joint distribution of inputs from the previous layer and target classes) to serve as the classifier module 108.

The classifier module 108 may additionally or alternatively include deep convolutional networks (DCNs). DCNs are networks of convolutional networks, configured with additional pooling and normalization layers. DCNs have achieved state-of-the-art performance on many tasks. DCN scan be trained using learning in which both the input and output targets are known for many exemplars and are used to modify the weights of the network by use of gradient descent methods.

DCNs may be feed-forward networks. In addition, as described above, the connections from a neuron in first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The performance of deep learning architectures may increase as more labeled data points become available or as computational power increases. Modern deep neural networks are routinely trained with computing resources that are thousands of times greater than what was available to a typical researcher just fifteen years ago.

New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 2:
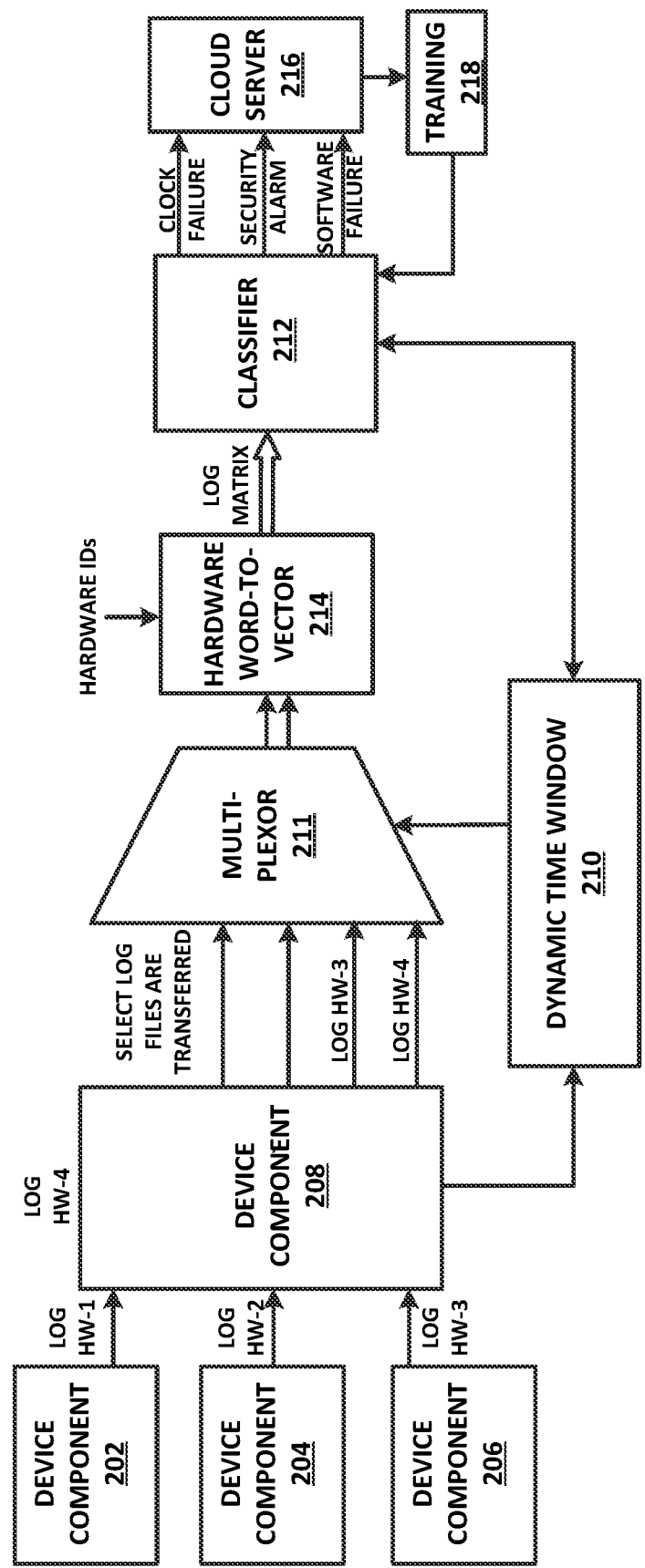
FIG. 2 is a block diagram of a illustrative system configured to troubleshoot an electronic device failure in a device, such as the IoT device of FIG. 1.

FIG. 2 is a block diagram of a illustrative system 200 configured to troubleshoot an electronic device failure in a device, such as the IoT device 100 of FIG. 1. The system 200 may analyze performance data received from a plurality of device components 202, 204, 206, 208. For illustrative purposes, the device components 202, 204, 206 may include low level circuits that form part of the IoT device. For instance, the device components 202, 204, 206 may include a clock module, a power management module, a peripheral interface, or another component included in a SoC or IoC. The device component 208 in the implementation of FIG. 2 may comprise a main computer processing unit (CPU) of the IoT device.

As shown in the illustrative configuration of the system 200, the device components 202, 204, 206 may provide outputs to the device component 208. The system 200 may receive performance data relating to the operation of one or more components of an IoT or other device. The illustrative device components 202, 204, 206 may be sensors, power management circuits, clock generators, or other integrated circuit (IC). Each of the device components 202, 204, 206 may communicate with the CPU of the IoT (i.e., device component 208). That device component 208 eventually communicates with a computing cloud or some other IoT devices.

The plurality of device components 202, 204, 206, 208 may initiate the generation of performance data in the form of log files, error messages, built-in self-test (BIST) reports, as well as word reports that include text or American Standard Code for Information Interchange (ASCII) files that include event data. More particularly, the device component 202 may output a first hardware log file (log HW-1), and the device component 204 may output a second hardware log file (log HW-2). The device component 206 may output a third hardware log file (log HW-3), and the device component 208 may output a fourth hardware log file (log HW-4). The performance data may be descriptive of events, some of which may be associated with an interrupt, underperforming operation, or other failure.

The events may have a timestamps associated with them, or the timestamps may be alternatively or additionally assigned at a dynamic time window 210 in communication with the device component 208. For instance, the dynamic time window 210 may in some implementations adjust a timestamp associated with an event based on historical training. The adjusted timestamp may position the event in more direct chronological alignment with a dependent event. The dynamic time window may allow the system to predict problems, classify them, and then go back and adjust a timestamp of a critical event(s) to avoid a catastrophic failure the next time around.

In the example of FIG. 2, the dynamic time window 210 may receive the performance data from the device component 208. The device time window 210 may function to prescreen or filter out some of the performance data to include only a portion to be transferred and analyzed. This feature may reduce power dissipation, as well as storage and processing requirements.

The screening process may be initiated at the time dynamic window 210. As represented in FIG. 2, the device component 208 transfers to a classifier 212 only the outputted log file (i.e., LOG HW-3 and LOG HW-4) from the device components 206, 208. That is, the device component 208 does not transfer the log files (i.e., LOG HW-1 and LOG HW-2) of the device components 202, 204. The log files LOG HW-1, LOG HW-2, LOG HW-3, and LOG HW-4 may include event data associated with a timestamp and a hardware ID, as well as an indication of hardware, a software failure, or other performance parameter. The dynamic time window 210 may be configured to include a portion of the performance data. As described herein in terms of FIG. 2, only two of the four log files may be transferred to the classifier module 212 for analysis and classification. The dynamic time window 210 may send a control signal to a multiplexor 211 or other combinational logic circuit to specify, filter, or otherwise manipulate which log files are passed on as inputs to the hardware word-to-vector module 214 (e.g., algorithm).

As such, the portion of the performance data included in the dynamic time window 210 may represent a relatively small percentage of the performance data for the purpose of focusing analysis and limiting the amount of data that must be transferred over a computing cloud or other analysis module. Put another way, the dynamic time window 210 may thus minimize the data used for processing and analysis of IoT devices and networks during failure or bug analysis. The dynamic time window 210 may more particularly include a portion of the performance data that includes first event data associated with a software or hardware failure.

In one sense, the dynamic time window 210 may include a stored collection of information pertaining to a plurality of events. As described herein, the collection of information may include a subset of the performance data. The stored collection of events may be organized according to the relative timing of each event with respect to one another.

Output from the multiplexor 211 may be provided to a hardware word-to-vector module 214. Hardware IDs may be used in conjunction with the classifier output at the hardware word-to-vector module 214. The hardware word-to-vector module 214 of an implementation may retrieve problem data from log files with unsupervised extraction. Natural language processing may be performed based on latent Dirichlet allocation to facilitate extraction and resolve ambiguity in the language and add a numerical structure to the data for further operations.

The data from the trouble log file may be parsed. For example, metadata, such as categorical feature vectors, may be generated. More particularly, unstructured text data may be cleaned and standardized. For example, time frequency inverse document frequency (TF-IDF) data may be input to a latent Dirichlet allocation (LDA) to vectorize the text data.

A word2vec technique may employ a neural network to prepare the data for support vector machine (SVM) processing.

A logarithmic matrix algorithm may be applied to the output of the hardware word-to-vector module 214. Other algorithms may be applied in different implementations in a manner that is consistent with the subject matter of this disclosure to format data (e.g., from the hardware word-to-vector module 214) for the classifier module 212.

The classifier module 212 may employ at least one of neural networking or machine learning processes on the portion of the performance data included within the dynamic time window. The classifier module 212 of an implementation may determine that a first event shares a dependency with a second event data of the performance data. For instance, a TCXO may provide a clock signal that minutely lags to cause a ripple effect leading to component failure. In another implementation, the device component 208 (e.g., the CPU) of the IoT device may determine that the first event shares a dependency with the second event data of the performance data.

In response to the determined dependency, the system 200 may manipulate the dynamic time window 210 to include the second event. In some instances, the system may execute fault analysis techniques on contents of the dynamic time window 210. The system 200 may output analysis regarding the failure determined from the first and second event data.

The classifier module 212 may feed back analyzed data to the dynamic time window 210. Such feedback may be used to relate that a signature or other indicator has been detected and suggests that an earlier or later occurring event contributed to a fault event included within the dynamic time window 210. In one implementation, the indication may be determined by the classifier module 212 by comparing performance data to a modeled and trained data.

The classifier module 212 may additionally output information to a computing cloud or other analysis hub. For instance, the classifier module 212 may output a clock failure, a software failure, as well as a security alarm. In an implementation, the classifier 212 may output the clock failure, security alarm, and software data to a cloud computing device 216. Such a computing device 216 may receive and assimilate similar analysis from a number of different IoT devices to perform modeling and training 218 that may be used by the classifier 212 in a future debugging operation. As such, the outputs of the classifier module 212 may be supplied in real time to improve classification at future debugging iterations. The cloud device 216 may receive outputs and analysis from and regarding multiple IoT devices to build a comprehensive training database and associated troubleshooting processes.

Figure 3:
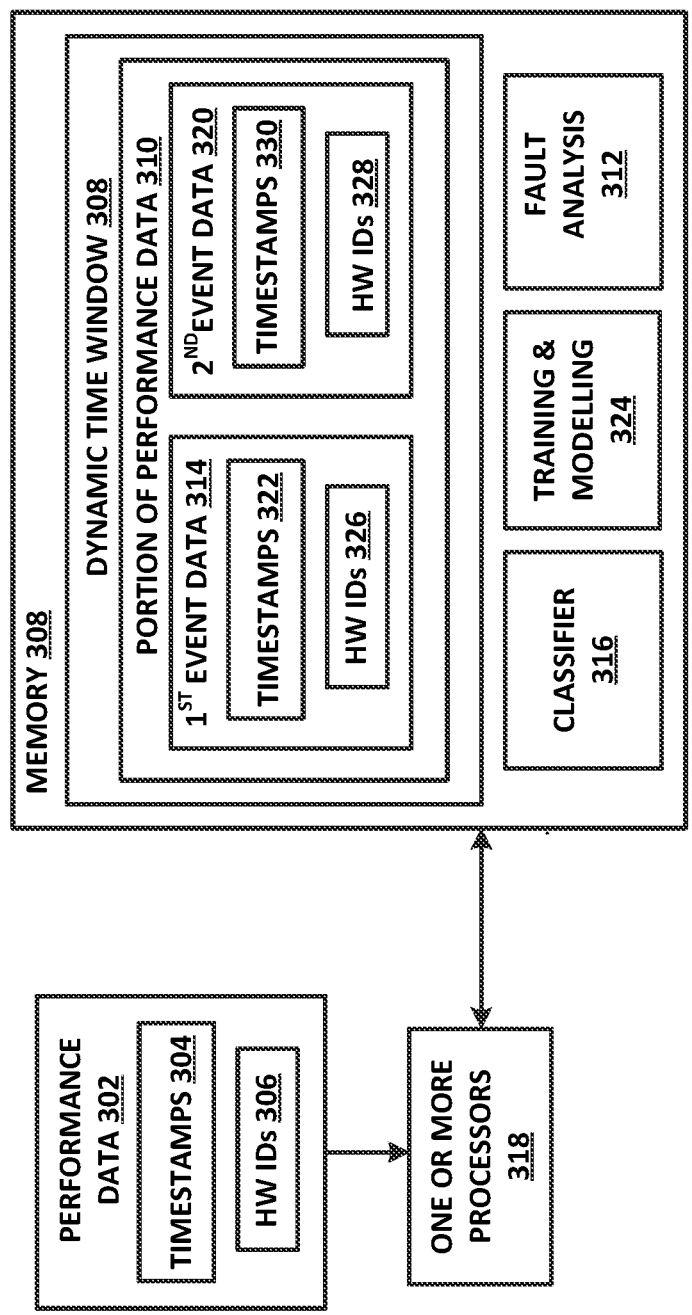
FIG. 3 is a block diagram of another illustrative system configured to troubleshoot an electronic device failure in a device, such as the IoT device of FIG. 1.

FIG. 3 is a block diagram of another illustrative system 300 configured to troubleshoot an electronic device failure in a device, such as the IoT device 100 of FIG. 1. The system 300 may receive performance data 302 relating to the operation of one or more components of an IoT or another electronic device. The performance data 302 may be retrieved or delivered in the form of log files, error messages, and word reports reflective of event associated with interrupts or other failures. The performance data 302 may include event data associated with timestamps 304 and hardware identifiers 306, as well as a description or indicator of a hardware, a software failure, or other performance parameter.

The performance data 302 of an implementation may include information (e.g., in a log file) concerning a response time and a frequency of an integrated circuit. Other illustrative information may regard a connection between a plurality of integrated circuits and an integrated circuit dependency to an IoT parameter. An illustrative IoT parameter may include a transmitter power and receiver sensitivity test to ensure specified transmission range performance is met. For instance, a receiver sensitivity test may check the level of signal strength that must be present at the receiver for it to decode the data correctly at a specific packet error rate. Another example of an IoT parameter may include packet error rate (PER). The PER measurement is commonly used to measure receiver performance checking if data sent by the transmitter is correctly received by a receiver. Still another illustrative IoT parameter may include a sensitivity search that is performed by adjusting an input power to the receiver over the entire power range to find the power level at which the PER starts to fail.

Other information included in the performance data 302 may include a priority and an importance of current classification results and a root cause analysis from a cloud controller. Root cause analysis may determine causal factors relating to a failure, focusing on why, how, and when it occurred. Still other information may include a report from another IoT device. For instance, the other IoT device may send a performance report to a computing cloud. As described herein, the information may ultimately be used to update a dynamic time windowing algorithm on an IoT device.

A dynamic time window 308 may be configured to include a portion 310 of the performance data 302. The portion 310 of the performance data 302 may include a relatively small percentage of the performance data 302 for the purpose of focusing analysis and limiting the amount of data that must be transferred over a computing cloud or be otherwise analyzed. Put another way, the dynamic time window 308 may thus minimize the data used for processing and analysis of IoT devices and networks during failure or bug analysis 312. The dynamic time window 308 may more particularly include the portion of the performance data that includes first event data 314 associated with a software or hardware failure.

A classifier module 316 may employ at least one of neural networking or machine learning processes on the portion 310 of the performance data 302 included within the dynamic time window 308. The classifier 316 or one or more processors 318 of the IoT may determine that the first event shares a dependency with second event data 320 of the performance data 302. For instance, a temperature-compensated crystal oscillator (TCXO) may provide a clock signal that minutely lags to cause a ripple effect leading to component failure.

In response to the determined dependency, the system may manipulate the dynamic time window to include the second event. As discussed herein, the dynamic time window 308 may include information pertaining to a plurality of events organized according to the relative timing of each event 314, 320 with respect to one another. As described herein, the collection of information may include a subset, or portion 310, of the performance data 302. In some implementations, the manipulation may include assigning the second event data 320 to a file comprising the dynamic time window 308. The dynamic time window 308 may include a relationship that includes the relative timing between the first and second event data 314, 320. Viewed another way, a boundary of the dynamic time window 308 may adjusted to extend its timeline to include the second event data 320 (so as to be included within the dynamic time window 308 along with the first event data 314). The relative timing of the interdependent event data may be analyzed in a focused manner that uses less processing resources than would analyzing an entirety of the retrieved performance data.

The dynamic time window 308 may in some implementations adjust a timestamps 322 associated with an event based on historical training. Prior to adjustment, the timestamps 322 may put the event in more direct chronological alignment with a dependent event. The dynamic time window may allow the system to predict problems, classify them, and then go back and adjust a timestamp of a critical event(s) to avoid a catastrophic failure the next time around.

In some instances, the system 300 may execute fault analysis techniques 406 on contents output from the dynamic time window 308. The system 300 may generate analysis regarding the failure determined from the first and second event data 314, 320. Such analysis and other generated data may be provided to a training and modelling module 312 to better train the classifier 316.

Figure 4:
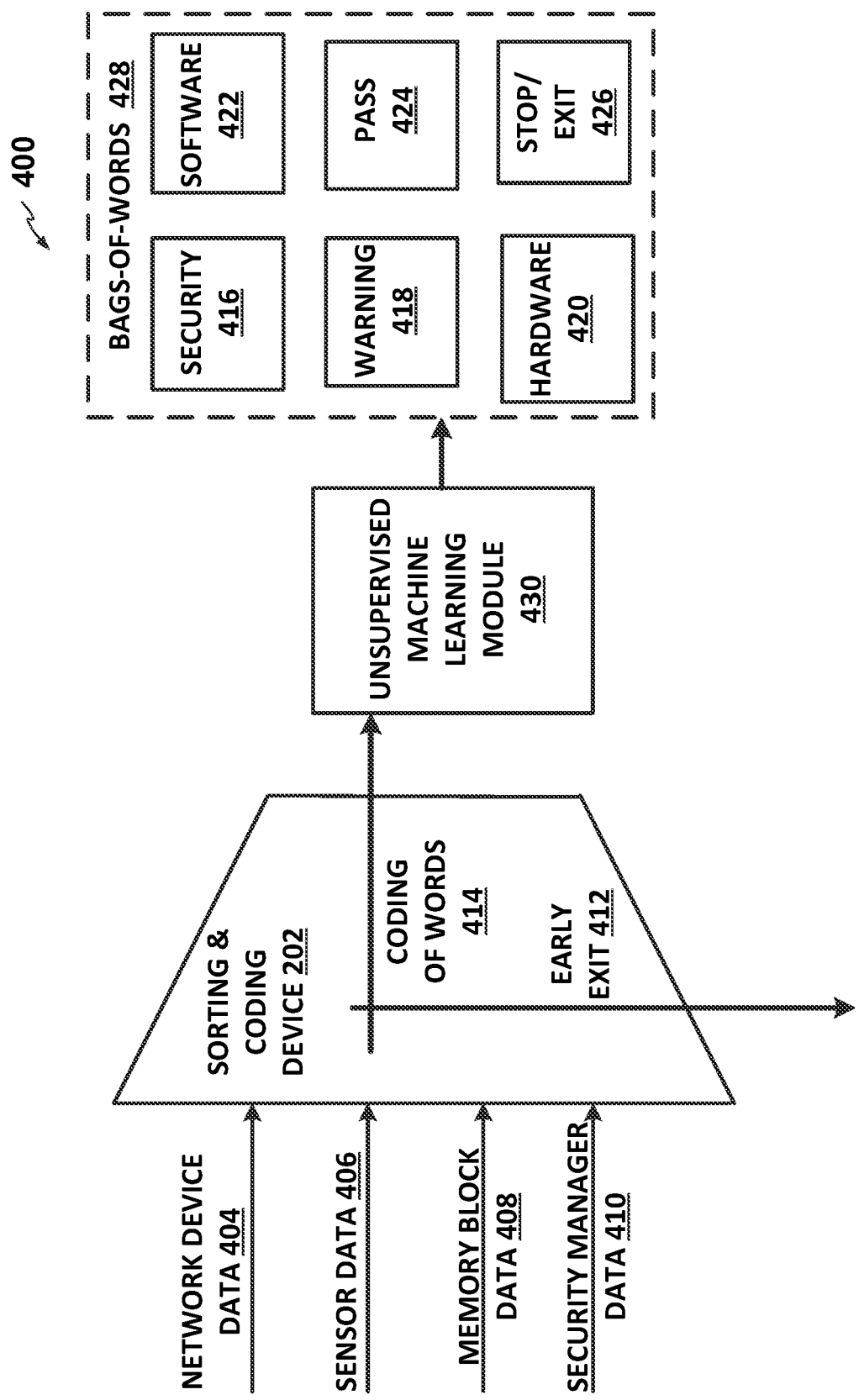
FIG. 4 is a block diagram illustrating a system configured to perform a hardware and software functionality of an implementation used to facilitate an early exit of superfluous data and the coding of error log files.

FIG. 4 is a block diagram illustrating a system 400 configured to perform a hardware and software functionality of an implementation used to facilitate an early exit of superfluous data and the coding of error log files. The system 400 may represent the functionality of one or more of the multiplexor 211, dynamic time window 210, hardware word-to-vector module 214, and classifier 212 of FIG. 2. In another example, the system 400 may represent the functionality of the one or more processors 318, dynamic time window 308, classifier 316, and training and modelling module 324 of FIG. 3.

Turning more particularly to FIG. 4, a sorting and coding system 402 may receiving inputs comprising performance data from network devices input 404, sensor data input 406, memory block data 408, and security manager data 410. The sorting and coding system 402 may minimize a total number of log file by performing an early exit function 412 of non-critical performance data. The sorting and coding system 402 may additionally perform a criticality assessment, or a coding functionality 414, based on weights and code-values of each word of the performance data based on its use within a particular critical log file.

The sorting functionality of the sorting and coding system 402 may use a bag-of-words model as a simplifying representation. A bag-of-words model is a vector space model that may be used in a natural language processing and information retrieval such that text (e.g., from a log file) is represented as a multiset of words. The bags-of-words may be categorized during a first stage to organize data for sorting.

Illustrative bags-of-words 428 may include a security bag 416, a warning bag 418, a hardware bag 420, and a software bag 422. Other illustrative bags may include pass bag 424 to categorize performance data that will be transferred for further analysis, and a stop/exit bag 426 to cause non-critical performance data to be excluded from further analysis.

The data that is passed may include a relatively small percentage of the performance data input to the sorting and coding system 402. The screening may focus analysis and limiting the amount of data that must be transferred over a computing cloud or be otherwise analyzed. Put another way, the sorting and coding system 402 may thus minimize the data used for processing and analysis of IoT devices and networks during failure or bug analysis. The sorting and coding device may more particularly sort the portion of the performance data that includes event data that may reviewed for an interdependency.

As shown in FIG. 4, regularized training, in accordance with aspects of the present disclosure may include bag-of-words 428 clustering performed by an unsupervised machine learning model 430. In the example of FIG. 4, the unsupervised machine learning model 430 may be based on the Top2Vec technique, which employs neural network processing to detect topics from input. The unsupervised machine learning model 430 generates resolution aware clusters using unsupervised learning on the full thread.

An embedding model may be generated based on the input data and the topics received from the unsupervised machine learning model 430. The embedding model implemented by Top2Vec jointly learns topic clusters and token embeddings from the training data in an unsupervised setting. The unsupervised machine learning model 430 may generate labeled data comprising the bags-of-words 428, which includes clusters and assignments. Assignments refer to the assignment of an input to one of the previously learned topics (e.g., clusters). To create the topics, the model learns how to create clusters of inputs. Those clusters then define the topics. At inference time, new inputs can be fed to this model, which will assign the input to one of the learned topic clusters. The resolution recommendation and assignment of the log file to a person to address the issue are then based on the assigned topic cluster.

While implementing this predictive system, a reduction in RMA count is achieved, decreasing costs. Time to market is improved by reducing turnaround time for overall debugging, which helps for locating register transfer level (RTL) bugs earlier, thus reducing costs to fix these bugs. The predictive system also prevents hardware bugs from moving group to group and eventually to customers, which may include business to business customer distributors as well as other customers. The predictive system facilitates convergence between different IoTs across different tiers, including value, modem, automotive, and extended reality (XR) tiers. Moreover, the predictive system leads to a better robust design of SoCs, subsystems, and other components. This predictive system is dynamically adaptive to many platforms such as simulation acceleration, system emulation, software enablement, pre-silicon and post silicon, system level tests (SLT)/advanced diagnostic team (ADT), and RMA support.

Figure 5:
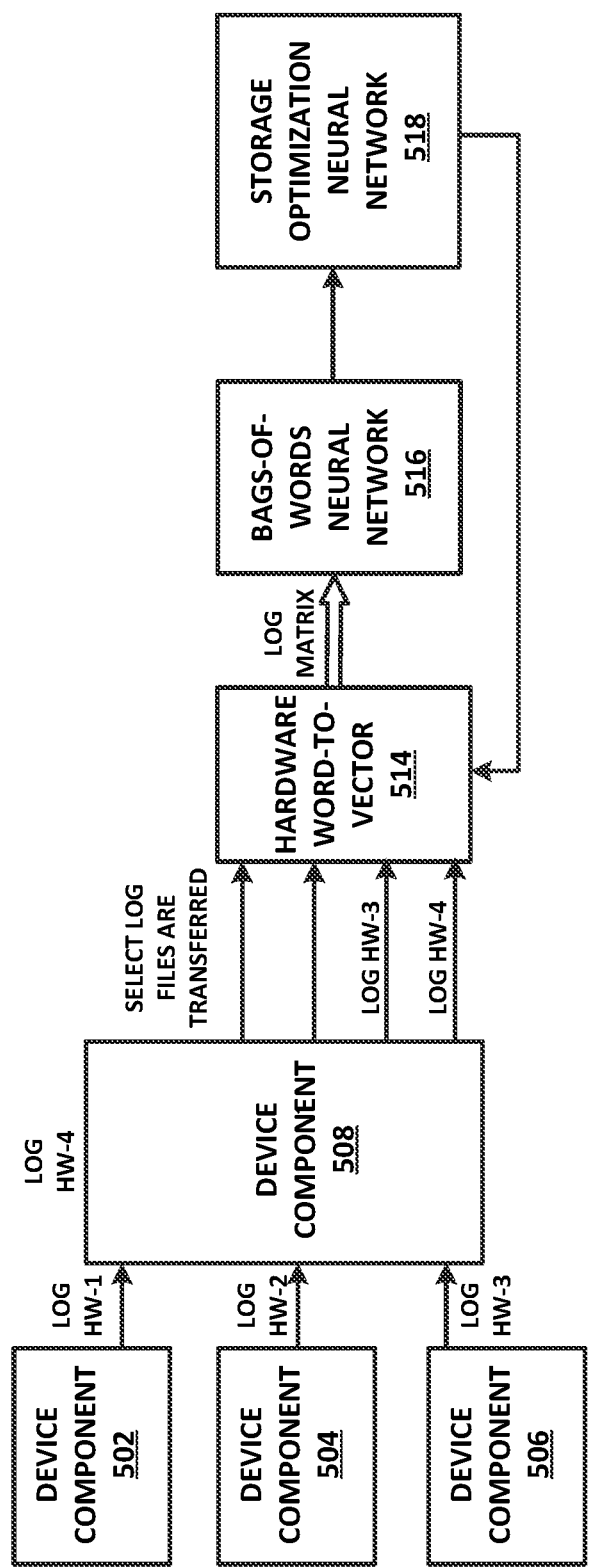
FIG. 5 is a diagram illustrating an exemplary deep convolutional network (DCN), in accordance with aspects of the present disclosure.

FIG. 5 is a block diagram of an illustrative system 500 for training a troubleshooting operation involving an electronic device failure in a manner that optimizes both a coding of words and of a storage area. The system 500 may analyze performance data received from a plurality of device components 502, 504, 506, 508. For illustrative purposes, the device components 502, 504, 506 may include low level circuits that form part of the IoT device. For instance, the device components 502, 504, 506 may include a clock module, a power management module, a peripheral interface, or another component included in a SoC or IoC. The device component 508 in one implementation may comprise a main computer processing unit (CPU) of the IoT device.

As shown in the illustrative configuration of the system 500, the device components 502, 504, 506 may provide outputs to the device component 508. The system 500 may receive performance data relating to the operation of one or more components of an IoT or another device. The illustrative device components 502, 504, 506 may be sensors, power management circuits, clock generators, or other integrated circuit (IC). Each of the device components 502, 504, 506 may communicate with the CPU of the IoT (i.e., device component 508). That device component 508 eventually communicates with a computing cloud or some other IoT devices.

The plurality of device components 502, 504, 506, 508 may initiate the generation of performance data in the form of log files, error messages, and word reports that include event data. More particularly, the device component 502 may output a first hardware log file (log HW-1), and the device component 504 may output a second hardware log file (log HW-2). The device component 506 may output a third hardware log file (log HW-3), and the device component 508 may output a fourth hardware log file (log HW-4). The performance data may be descriptive of events, some of which may be associated with an interrupt, underperforming operation, or other failure.

The events may have a timestamps associated with them, or the timestamps may be alternatively or additionally assigned. As shown, the device component 508 transfers to a classifier 512 only the outputted log file (i.e., LOG HW-3 and LOG HW-4) from the device components 506, 508. That is, the device component 508 does not transfer the log files (i.e., LOG HW-1 and LOG HW-2) of the device components 502, 504. The log files LOG HW-1, LOG HW-2, LOG HW-3, and LOG HW-4 may include event data associated with a timestamp and a hardware ID, as well as an indication of hardware, a software failure, or other performance parameter. As described herein in terms of FIG. 5, only two of the four log files may be transferred to the classifier module 512 for analysis and classification.

Output from the device component 508 may be provided to a hardware word-to-vector module 514. The hardware word-to-vector module 514 of an implementation may retrieve problem data from log files with unsupervised extraction. Natural language processing may be performed based on latent Dirichlet allocation to facilitate extraction and resolve ambiguity in the language and add a numerical structure to the data for further operations. The data from the trouble log file is parsed. For example, metadata, such as categorical feature vectors may be generated. Unstructured text data may be cleaned and standardized. For example, TF-IDF data may be input to an LDA to vectorize the text data. A word2vec algorithm may employ a neural network to prepare the data for SVM processing. A logarithmic matrix algorithm may be applied to the output of the hardware word-to-vector module 514. Other algorithms may be applied in different implementations in a manner that is consistent with the subject matter of this disclosure to format data (e.g., from the hardware word-to-vector module 514).

Log file text and attributes may be used to group the data into semantically similar clusters. This may be performed by unsupervised machine learning. The clustering facilitates topic extraction and recommendation. Key words may be extracted and used to assign clusters to define each per-cluster topic/category. The hardware word-to-vector module 514 may select relevant log files using feature vector K-nearest neighbors (KNN) within the topic cluster. The KNN algorithm is a supervised learning technique that can be used for regression as well as classification. KNN performs a distance calculation between the test data and all the training points in an effort to determine to which class the data being evaluated should be assigned. The K number of points that are most closely related to the test data should be chosen.

The generated output may be provided to a bag-of-words neural network 516. The bag-of-words neural network 516 may be similar to the sorting and coding system 402 of FIG. 2. The generated bags-of-words may be transferred to a storage optimization neural network layer module 518. The loading the bags-of-words to the to the neural network may identify and package critical log files before transferring them to a computing cloud.

The storage optimization neural network layer module 518 may perform criticality analysis to weight the word values found to be more critical than others. This weighting may be used to prioritize which words are stored an accessible way to organize storage and ultimately preserve power and memory resources. The neural network stored coded words may be fed back to the hardware word-to-vector module 514. In this manner, the implementation may provide training that optimizes both the coding of words and storage space. Initial neural network parameters (e.g., of the classifier 316 of FIG. 3 or of the hardware word-to-vector module 514) may be based on a previous training run or can be user defined.

Figure 6:
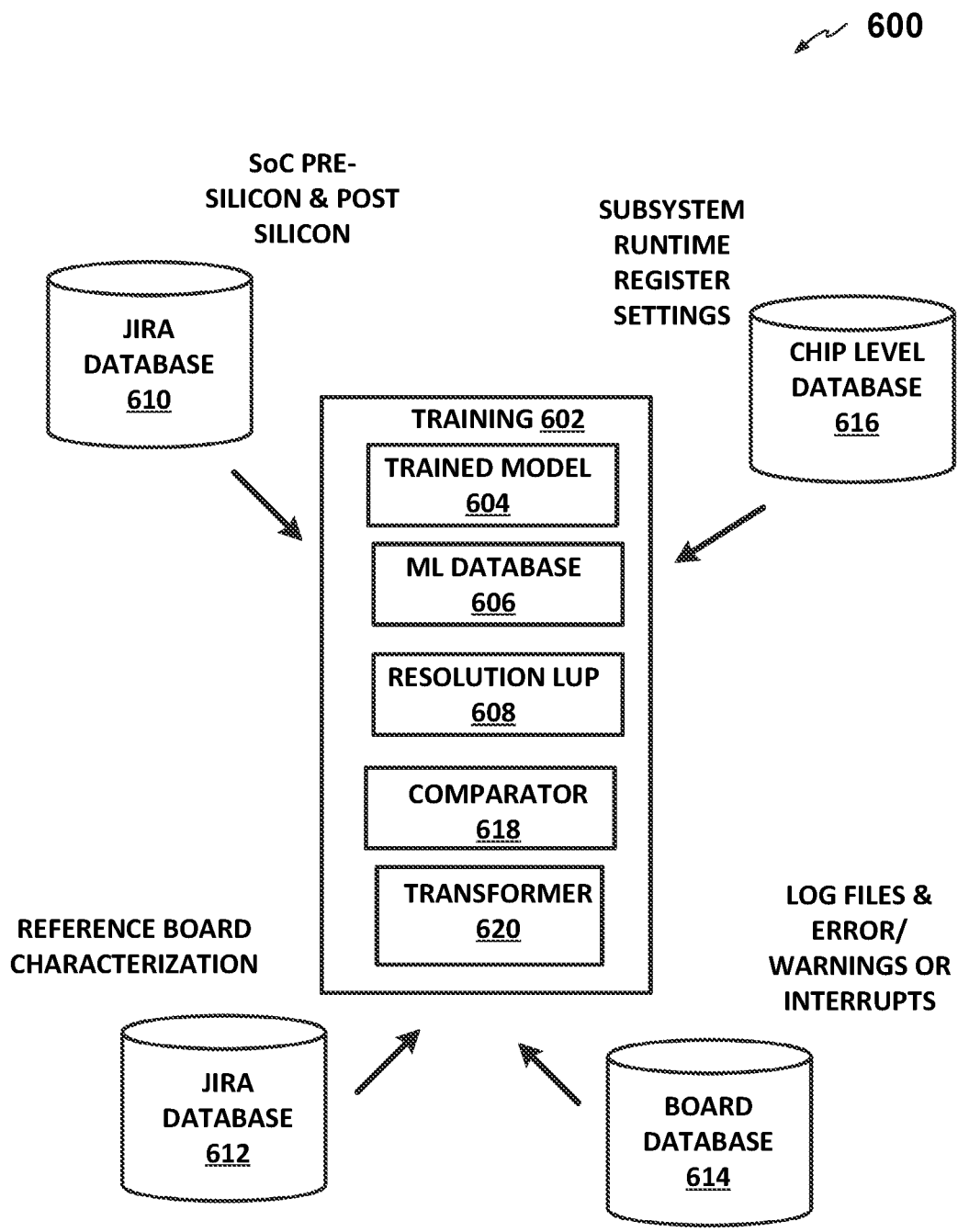
FIG. 6 is a block diagram of a training system configured to receive inputs from a plurality of databases towards training a system configured to debug or otherwise troubleshoot faults in IoT devices.

FIG. 6 is a block diagram of a training system 600 configured to receive inputs from a plurality of databases towards training a system configured to debug or otherwise troubleshoot faults in IoT devices. A training module 602 may be similar to the training and modelling module 324 of FIG. 4. Training may include clustering database log file by source. In the example of FIG. 6, a database 610 may be a Jira database from Atlassian Corporation Plc, storing more than 10,000 trouble log files. Clustering the log files may include unsupervised extraction of primary log file topics, followed by validation with expert review. Topic clusters may be associated with topic descriptions. The topic descriptions may be stored in human readable form. A trained model 604, machine learning (ML) annotated database 606, and an expert generated resolution look-up table (LUT) 608 may be created.

The training module 602 may be used for inference and may be trained against a full comment body of previous resolution efforts. That is, all correspondence from the time an input query is generated until the time the query was resolved is considered during the training.

The Jira database 610 may include SoC pre-silicon and post silicon data. Another Jira database 612 may include reference board characterization data. A board database 614 may include log files, in addition to errors, warnings and/or interrupts. A chip level database 616 may include subsystem runtime register settings data. The input data from the databases 610, 612, 614, 616 may be processed by a comparator module 618 and transformer module 620 of the training module 602. Additional databases may be added during training. Bigram and Trigram models may be generated based on a determined hardware or software dependency, and the system 600 may use hardware based tokenization for authentication considerations at a computing cloud or other training and analysis module. The processing may result in training used on an initial run of an illustrative system configured to troubleshoot an electronic device failure in a device, such as the IoT device 100 of FIG. 1.

Figure 7:
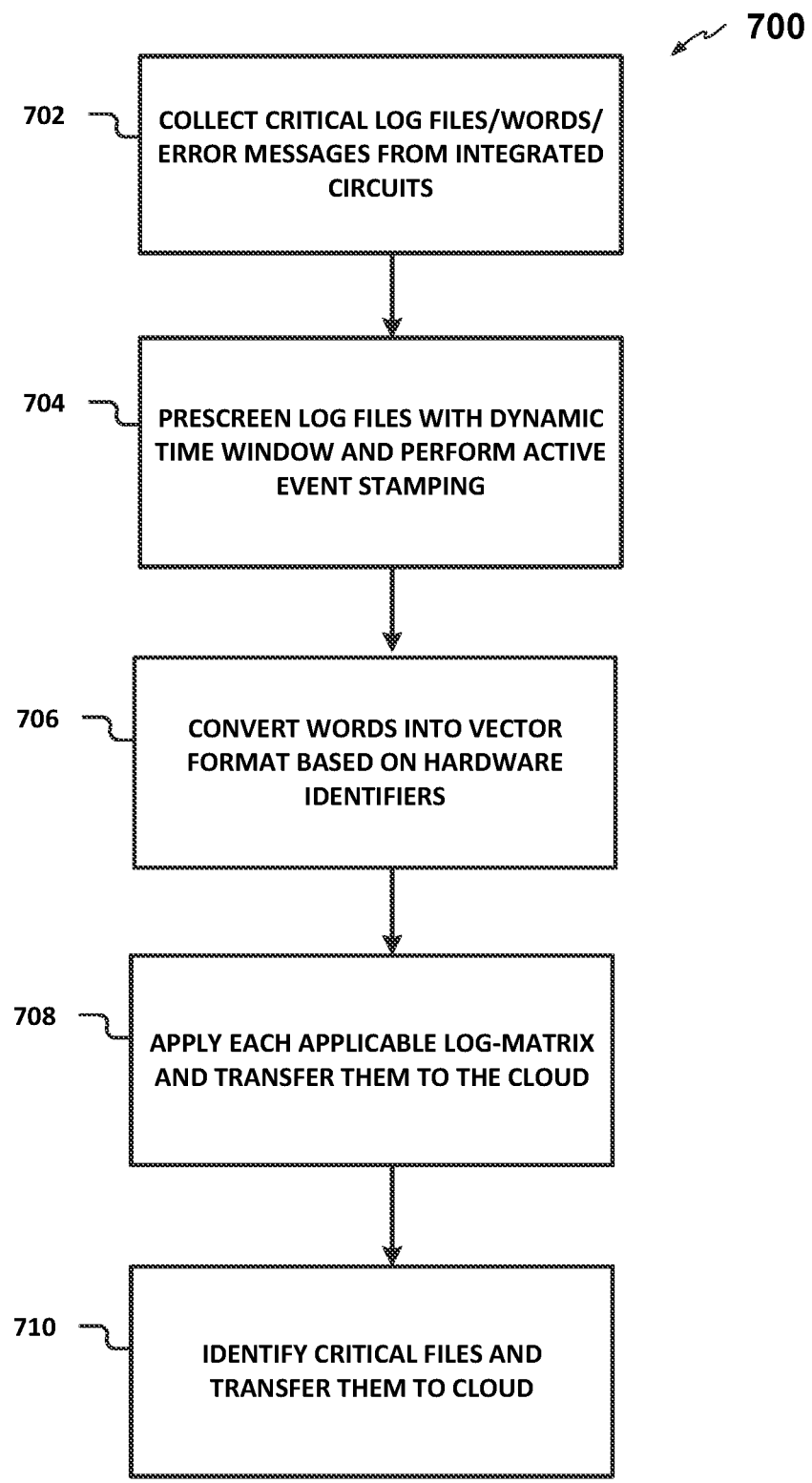
FIG. 7 is a flow diagram of an implementation of an illustrative method in accordance with various aspects of the present disclosure to dynamically adjust a dynamic time window according to machine learning and natural language processing feedback for IoT device troubleshooting.

FIG. 7 is a flow diagram of an implementation of an illustrative method 700 comprising processes performed, for example, by a processor, in accordance with various aspects of the present disclosure. For example, the illustrative method 700 may be performed by the systems 200 and 300 described in FIGS. 2 and 3. In one sense, the illustrative method 700 describes a process of dynamically adjusting a dynamic time window according to machine learning and natural language processing-feedback for IoT device troubleshooting.

Turning particularly to the processes of the flow diagram, critical performance data, such as log files, words, error messages may be collected at 702 from a plurality of components of an IoT device. In one particular example, the log file may be associated with an emulation platform for the IoT device or a test chip implementation for an SoC of the IoT device. In a particular implementation, a CPU of the IoT device may receive the performance data. In terms of FIG. 2, the component device 208 may receive log files from device components 204, 206, and 208. The device 208 may comprise the main CPU of the IoT 200.

At 704, the log files may be prescreened with the dynamic time window, which may perform active event timestamping. For example, the dynamic time window 210 of FIG. 2 may prescreen the performance data by choosing select log files. The device time window 210 may function to prescreen or filter out some of the performance data to include only a portion to be transferred and analyzed. As such, the portion of the performance data included in the dynamic time window 210 may represent a relatively small percentage of the performance data for the purpose of focusing analysis and limiting the amount of data that must be transferred over a computing cloud or other analysis module. Put another way, the dynamic time window 210 may thus minimize the data used for processing and analysis of IoT devices and networks during failure or bug analysis. This feature may reduce power dissipation, as well as storage and processing requirements.

The log files may include events that are assigned timestamps at a dynamic time window 210. For instance, the dynamic time window 210 may in some implementations adjust a timestamp associated with an event based on historical training. The adjusted timestamp may position the event in more direct chronological alignment with a dependent event. The dynamic time window may allow the system to predict problems, classify them, and then go back and adjust a timestamp of a critical event(s) to avoid a catastrophic failure on a next processing iteration.

At 706, the method 700 may include converting words into vector format based on hardware identifiers (IDs). In terms of FIG. 2, output from the multiplexor 211 may be provided to a hardware word-to-vector module 214. Hardware IDs may be associated with the classifier output at the hardware word-to-vector module 214. The hardware word-to-vector module 214 of an implementation may retrieve problem data from log files with unsupervised extraction. Natural language processing may be performed to facilitate extraction and resolve ambiguity in the language and add a numerical structure to the data for further operations. Metadata, such as categorical feature vectors, may be generated. More particularly, unstructured text data may be cleaned and standardized to vectorize the text data. A word2vec technique may employ a neural network to prepare the data for SVM processing.

At 708, the method 700 may apply log-matrix processes individually to pretrained neural networks. For instance, a logarithmic matrix algorithm of FIG. 2 may be applied to the output of the hardware word-to-vector module 214. Other algorithms may be applied in different implementations in a manner that is consistent with the subject matter of this disclosure to format data.

The method 700 may identify at 710 critical log files to be transferred to a computing cloud. For instance, the classifier module 212 may upload clock failure, security alarm, and software failure data to the computing cloud.

Figure 8:
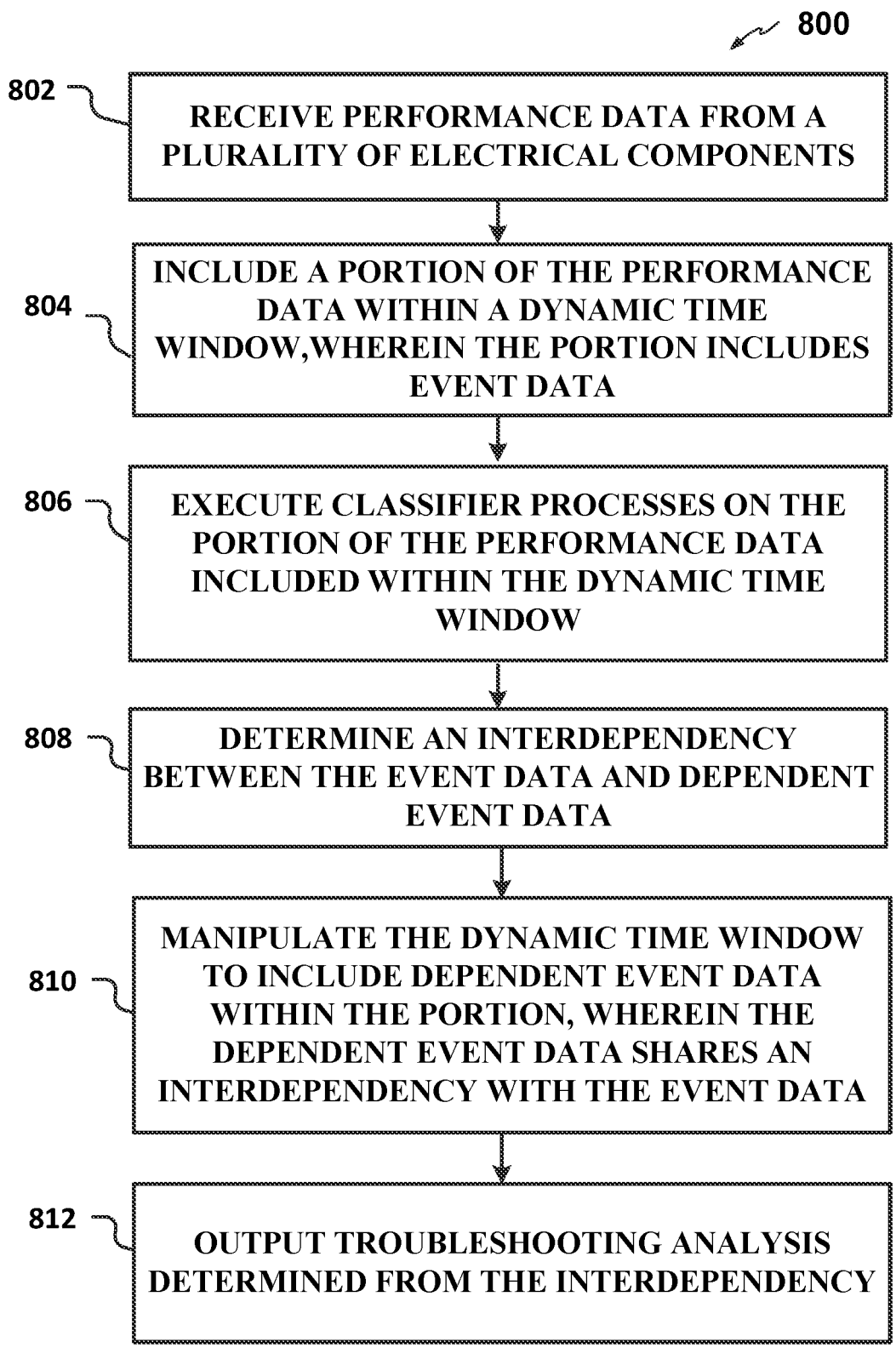
FIG. 8 is a flow diagram of another implementation of processor-implemented method of troubleshooting an electronic device failure, which may be performed by the systems described in FIGS. 2 and 3.

FIG. 8 is a flow diagram of another implementation of processor-implemented method of troubleshooting an electronic device failure. The illustrative method 800 may be performed by the systems 200 and 300 described in FIGS. 2 and 3.

At 802, the method 800 may include receiving performance data from a plurality of electrical components. In terms of FIG. 2, the component device 208 may receive log files from device components 204, 206, and 208. The device 208 may comprise the main CPU of the IoT 200.

The method at 804 may include a portion of the performance data within a dynamic time window. The portion includes first event data. In some instances described herein, the portion may be associated with a failure. For purposes of this disclosure, a failure may include an issue caused by an underperforming component or process. For example, the dynamic time window 308 of FIG. 3 may include a portion of the performance data 310. The performance data 310 may include first event data 314.

At 806, the method 800 may include executing classifier processes on the portion of the performance data included within the dynamic time window. For instance, the classifier 212 of Figure may execute classifier processes on the performance data included within the dynamic time window 210.

The method 800 may determine at 808 an interdependency between the event data and dependent event data. In one example, this determination may include that the first event shares a dependency with second event data of the performance data. For example, the one or more processors 318 of FIG. 3 may determine that the first event data 314 shares a dependency with the second event data 320.

At 808, the method 800 may manipulate at 810 the dynamic time window to include the dependent event data within the portion. As described herein, the event data and the dependent event data may share the interdependency. For instance, the one or more processors 318 of FIG. 3 may manipulate the second event data 320 to be within the dynamic time window 308 in response to the determined dependency.

At 812, the method may include outputting analysis determined from the interdependency. In one aspect, the analysis may regard the failure as determined from the first and second event data. For example, the classifier 212 of FIG. 2 may output clock failure, security alarm, and software data to a cloud computing device 216. Such a computing device 216 may receive and assimilate similar analysis from a number of different IoT devices to perform modeling and training 218 that may be used by a classifier 212 in a future debugging operation.

Implementation examples are described in the following numbered clauses:

1. A processor-implemented method of troubleshooting operation of an electronic device, the method comprising:
   receiving performance data from a plurality of electrical components;
   including a portion of the performance data within a dynamic time window, wherein the portion includes event data;
   manipulating the dynamic time window to include dependent event data within the portion, wherein the dependent event data shares an interdependency with the event data; and
   outputting troubleshooting analysis determined from the interdependency.

2. The method of clause 1, further comprising executing classifier processes on the portion of the performance data included within the dynamic time window.

3. The method of clause 1 or 2, wherein executing the classifier processes further comprises performing at least one of natural language processing or machine learning.

4. The method of any of clauses 1-3, wherein the event data is associated with a failure.

5. The method of any of clauses 1-4, further comprising determining the interdependency between the event data and the dependent event data.

6. The method of any of clauses 1-5, wherein the dynamic time window is manipulated in response to determining the interdependency.

7. The method of any of clauses 1-6, further comprising adjusting a timestamp of at least one of the event data and the dependent data.

8. The method of any of clauses 1-7, further comprising organizing the event data and the dependent event data within the dynamic time window according to a relative timing of each with respect to one another.

9. The method of any of clauses 1-8, wherein the performance data includes at least one of: a log file, an error message, a built-in self-test (BIST) report, a word report, text, or an American Standard Code for Information Interchange (ASCII) file.

10. The method of any of clauses 1-9, wherein the performance data includes information concerning at least one of: a response time of an integrated circuit, a frequency of an integrated circuit, a connection between a plurality of integrated circuits, an integrated circuit dependency to an Internet of Things (IoT) board parameter, a priority of current classification results, an importance of current classification results, a root cause track from a cloud controller, or a report from another IoT device.

11. The method of any of clauses 1-10, wherein the plurality of electrical components comprises part of an Internet of Things (IoT) device or a system on a chip (SoC).

12. The method of any of clauses 1-11, further comprising determining that the event data shares the interdependency with the event data by performing the determining at a classifier or a main processor of an Internet of Things (IoT) device.

13. The method of any of clauses 1-12, further comprising performing a criticality assessment on the performance data to determine the portion of the performance data.

14. The method of any of clauses 1-13, further comprising weighting critical data based on the criticality assessment.

15. The method of any of clauses 1-14, further storing the analysis in a historical database to train for future event dependencies.

16. The method of any of clauses 1-15, further comprising applying a word-to-vector algorithm to the portion of the performance data.

17. The method of any of clauses 1-16, further comprising categorizing the portion of the performance data into a plurality of bags-of-words.

18. An apparatus for troubleshooting operation of an electronic device, the apparatus comprising:
   one or more processors,
   memory coupled with the one or more processors; and
   instructions stored in the memory and executable by the one or more processors to cause the one or more processors to:
   receive performance data from a plurality of electrical components;
   include a portion of the performance data within a dynamic time window, wherein the portion includes event data;
   manipulate the dynamic time window to include dependent event data within the portion, wherein the dependent event data shares an interdependency with the event data; and
   output troubleshooting analysis determined from the interdependency.

19. The apparatus of clause 18, wherein the one or more processors are further configured to execute classifier processes on the portion of the performance data included within the dynamic time window.

20. The apparatus of clause 18 or 19, wherein the classifier processes include at least one of natural language processing or machine learning.

21. The apparatus of any of clauses 18-20, wherein the event data is associated with a failure.

22. The apparatus of any of clauses 18-21, wherein the one or more processors are further configured to determine the interdependency between the event data and the dependent event data.

23. The apparatus of any of clauses 18-22, wherein the dynamic time window is manipulated in response to determining the interdependency.

24. The apparatus of any of clauses 18-23, wherein the one or more processors are further configured to adjust a timestamp of at least one of the event data and the dependent data.

25. The apparatus of any of clauses 18-24, wherein the one or more processors are further configured to organize the event data and the dependent event data within the dynamic time window according to a relative timing of each with respect to one another.

26. The apparatus of any of clauses 18-25, wherein the performance data includes at least one of: a log file, an error message, a built-in self-test (BIST) report, a word report, text, or an American Standard Code for Information Interchange (ASCII) file.

27. The apparatus of any of clauses 18-26, wherein the one or more processors are further configured to determine that the event data shares the interdependency with the event data by performing the determining at a classifier or a main processor of an Internet of Things (IoT) device.

28. The apparatus of any of clauses 18-27, wherein the one or more processors are further configured to store the analysis in a historical database to train for future event dependencies.

29. An apparatus comprising:
   a means for receiving performance data from a plurality of electrical components;
   a means for including a portion of the performance data within a dynamic time window, wherein the portion includes event data; and
   a means for manipulating the dynamic time window to include dependent event data within the portion, wherein the dependent event data shares an interdependency with the event data; and.
   a means for outputting troubleshooting analysis determined from the interdependency.

30. A non-transitive computer-readable medium storing computer executable code to:
   receive performance data from a plurality of electrical components;
   include a portion of the performance data within a dynamic time window, wherein the portion includes event data;
   manipulate the dynamic time window to include dependent event data within the portion, wherein the dependent event data shares an interdependency with the event data; and
   output troubleshooting analysis determined from the interdependency.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also may be implemented in combination in a single implementation. Conversely, various features that are described in the context of a single implementation also may be implemented in multiple implementations separately or in any suitable sub combination. As such, although features may be described above as acting in particular combinations, and even initially claimed as such, one or more features from a claimed combination may in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart, or flow diagram. However, other operations that are not depicted may be incorporated in the example processes that are schematically illustrated. For example, one or more additional operations may be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

What is claimed is:

1. A processor-implemented method of troubleshooting operation of an electronic device, the method comprising:
   receiving performance data from a plurality of electrical components;
   including a portion of the performance data within a dynamic time window, wherein the portion includes event data;
   manipulating the dynamic time window to include dependent event data within the portion, wherein the dependent event data shares an interdependency with the event data; and
   outputting troubleshooting analysis determined from the interdependency.

2. The method of claim 1, further comprising executing classifier processes on the portion of the performance data included within the dynamic time window.

3. The method of claim 2, wherein executing the classifier processes further comprises performing at least one of natural language processing or machine learning.

4. The method of claim 1, wherein the event data is associated with a failure.

5. The method of claim 1, further comprising determining the interdependency between the event data and the dependent event data.

6. The method of claim 1, wherein the dynamic time window is manipulated in response to determining the interdependency.

7. The method of claim 1, further comprising adjusting a timestamp of at least one of the event data and the dependent data.

8. The method of claim 1, further comprising organizing the event data and the dependent event data within the dynamic time window according to a relative timing of each with respect to one another.

9. The method of claim 1, wherein the performance data includes at least one of: a log file, an error message, a built-in self-test (BIST) report, a word report, text, or an American Standard Code for Information Interchange (ASCII) file.

10. The method of claim 1, wherein the performance data includes information concerning at least one of: a response time of an integrated circuit, a frequency of an integrated circuit, a connection between a plurality of integrated circuits, an integrated circuit dependency to an Internet of Things (IoT) board parameter, a priority of current classification results, an importance of current classification results, a root cause track from a cloud controller, or a report from another IoT device.

11. The method of claim 1, wherein the plurality of electrical components comprises part of an Internet of Things (IoT) device or a system on a chip (SoC).

12. The method of claim 1, further comprising determining that the event data shares the interdependency with the event data by performing the determining at a classifier or a main processor of an Internet of Things (IoT) device.

13. The method of claim 1, further comprising performing a criticality assessment on the performance data to determine the portion of the performance data.

14. The method of claim 13, further comprising weighting critical data based on the criticality assessment.

15. The method of claim 1, further storing the analysis in a historical database to train for future event dependencies.

16. The method of claim 1, further comprising applying a word-to-vector algorithm to the portion of the performance data.

17. The method of claim 1, further comprising categorizing the portion of the performance data into a plurality of bags-of-words.

18. An apparatus for troubleshooting operation of an electronic device, the apparatus comprising:
  one or more processors,
  memory coupled with the one or more processors; and
  instructions stored in the memory and executable by the one or more processors to cause the one or more processors to:
    receive performance data from a plurality of electrical components;
    include a portion of the performance data within a dynamic time window, wherein the portion includes event data;
    manipulate the dynamic time window to include dependent event data within the portion, wherein the dependent event data shares an interdependency with the event data; and
    output troubleshooting analysis determined from the interdependency.

19. The apparatus of claim 18, wherein the one or more processors are further configured to execute classifier processes on the portion of the performance data included within the dynamic time window.

20. The apparatus of claim 19, wherein the classifier processes include at least one of natural language processing or machine learning.

21. The apparatus of claim 18, wherein the event data is associated with a failure.

22. The apparatus of claim 18, wherein the one or more processors are further configured to determine the interdependency between the event data and the dependent event data.

23. The apparatus of claim 18, wherein the dynamic time window is manipulated in response to determining the interdependency.

24. The apparatus of claim 18, wherein the one or more processors are further configured to adjust a timestamp of at least one of the event data and the dependent data.

25. The apparatus of claim 18, wherein the one or more processors are further configured to organize the event data and the dependent event data within the dynamic time window according to a relative timing of each with respect to one another.

26. The apparatus of claim 18, wherein the performance data includes at least one of: a log file, an error message, a built-in self-test (BIST) report, a word report, text, or an American Standard Code for Information Interchange (ASCII) file.

27. The apparatus of claim 18, wherein the one or more processors are further configured to determine that the event data shares the interdependency with the event data by performing the determining at a classifier or a main processor of an Internet of Things (IoT) device.

28. The apparatus of claim 18, wherein the one or more processors are further configured to store the analysis in a historical database to train for future event dependencies.

29. An apparatus comprising:
  a means for receiving performance data from a plurality of electrical components;
  a means for including a portion of the performance data within a dynamic time window, wherein the portion includes event data; and
  a means for manipulating the dynamic time window to include dependent event data within the portion, wherein the dependent event data shares an interdependency with the event data; and,
  a means for outputting troubleshooting analysis determined from the interdependency.

30. A non-transitive computer-readable medium storing computer executable code to:
  receive performance data from a plurality of electrical components;
  include a portion of the performance data within a dynamic time window, wherein the portion includes event data;
  manipulate the dynamic time window to include dependent event data within the portion, wherein the dependent event data shares an interdependency with the event data; and
  output troubleshooting analysis determined from the interdependency.

* * * * *